(12) United States Patent
Dotsey et al.

(10) Patent No.: US 8,087,680 B2
(45) Date of Patent: Jan. 3, 2012

(54) STROLLER WITH CAR SEAT ATTACHMENT

(75) Inventors: Michael A. Dotsey, Pottstown, PA (US); Patrick Nolan, Royersford, PA (US)

(73) Assignee: Graco Children's Products Inc., Atlanta, GA (US)

( * ) Notice: Subject to any disclaimer, the term of this patent is extended or adjusted under 35 U.S.C. 154(b) by 463 days.

(21) Appl. No.: 11/732,720

(22) Filed: Apr. 3, 2007

(65) Prior Publication Data
US 2007/0257458 A1 Nov. 8, 2007

Related U.S. Application Data

(60) Provisional application No. 60/789,240, filed on Apr. 3, 2006.

(51) Int. Cl.
*B62B 7/12* (2006.01)

(52) U.S. Cl. ............................ 280/47.38; 297/256.16

(58) Field of Classification Search .................. 280/642, 280/647, 650, 658, 47.38; 297/232, 250.1, 297/256.16
See application file for complete search history.

(56) References Cited

U.S. PATENT DOCUMENTS

| | | | | |
|---|---|---|---|---|
| 5,388,853 | A | * | 2/1995 | Lauro ............................ 280/642 |
| 5,622,376 | A | * | 4/1997 | Shamie ........................ 280/642 |
| 5,676,386 | A | * | 10/1997 | Huang ............................ 280/30 |
| 5,709,400 | A | | 1/1998 | Bonnier et al. |
| 5,772,279 | A | * | 6/1998 | Johnson, Jr. .................. 297/130 |
| 5,934,757 | A | * | 8/1999 | Smith ....................... 297/452.13 |
| 6,099,022 | A | | 8/2000 | Pring |
| 6,189,914 | B1 | | 2/2001 | Worth et al. |
| 6,193,263 | B1 | | 2/2001 | Lin |
| 6,203,054 | B1 | | 3/2001 | Matsumoto |
| 6,209,892 | B1 | | 4/2001 | Schaaf et al. |
| 6,302,412 | B1 | | 10/2001 | Worth |
| 6,398,233 | B1 | | 6/2002 | Liang et al. |
| 6,446,990 | B1 | | 9/2002 | Nania et al. |
| 7,032,922 | B1 | * | 4/2006 | Lan ............................... 280/648 |
| 7,396,038 | B2 | | 7/2008 | Zweideck |
| 2006/0001226 | A1 | | 1/2006 | Refsum |

FOREIGN PATENT DOCUMENTS

| | | |
|---|---|---|
| DE | 203 20 209 | 3/2004 |
| DE | 203 20 208 | 4/2004 |
| EP | 1 741 614 | 1/2007 |
| EP | 1 826 094 | 8/2007 |
| FR | 2 743 539 | 7/1997 |
| FR | 2 837 160 | 9/2003 |
| FR | 2 856 970 | 2/2005 |

(Continued)

OTHER PUBLICATIONS

International Search Report and Written Opinion issued in related International application No. PCT/US2007/008420 mailed Sep. 28, 2007.
Britax Preview Lightweight Umbrella Travel System (Jun. 2004).
International Preliminary Report on Patentability issued in related International application No. PCT/US2007/008420 mailed Oct. 8, 2008.

*Primary Examiner* — Frank Vanaman

(74) *Attorney, Agent, or Firm* — Lempia Summerfield Katz LLC

(57) ABSTRACT

A stroller is configured to transport interchangeable child seats. The stroller includes a stroller frame having a first set of connection locations removably attach to a first child seat. The frame also includes a removable child seat adapter that can be connected to the stroller frame such that the stroller frame presents a second set of connection locations that removably attach to a second child seat.

19 Claims, 12 Drawing Sheets

FOREIGN PATENT DOCUMENTS

| GB | 2 343 840 | 5/2000 |
| GB | 2 351 047 | 12/2000 |
| NL | 1 018 642 | 5/2002 |
| WO | WO 03/035448 | 5/2003 |

* cited by examiner

STROLLER WITH CAR SEAT ATTACHMENT

RELATED APPLICATION DATA

This application claims the benefit of provisional application No. 60/789,240 filed Apr. 3, 2006, the disclosure of which is hereby incorporated by reference as if set forth in its entirety herein.

BACKGROUND OF THE INVENTION

1. Field of the Disclosure

The present disclosure is generally directed to baby strollers, and more particularly relates to a stroller of the type that can interchangeably receive more than one seat.

2. Description of Related Art

Well-designed strollers should be sturdy and balanced, and should provide the child passenger with safe and comfortable transport. Throughout the development of strollers, an effort has been made to include features that render the stroller versatile and convenient. Efforts have been made to provide these features while achieving a simple design, yet maintaining the stroller rugged and reliable.

A conventional stroller has a plurality of wheels supporting a frame that supports one or more stroller seats. The frame has two spaced front legs, two spaced rear legs, one or more push arms, and a crossbar connected at its laterally outer ends to the push arms. The crossbar can be provided with a pair of laterally spaced gripping surfaces that can be engaged by a user when driving the stroller, and a handle assembly disposed between the gripping surfaces.

Conventional strollers include one or more features that enhance their versatility. For instance, some strollers include one or more baskets that provide for the storage of certain items. Additional features include retractable or removable child trays and cupholders. Still other features allow the stroller to fold between an open, in-use, configuration and a compacted closed position. Other features commonly available in the child transportation industry include car seats that include a base that is mounted, for instance, onto an automobile seat, and a carrier attached to a base. The carrier can be removed from the base to facilitate transportation of the child in and out of the automobile. Unfortunately, children disposed in a carrier need to be disturbed when being transported from the carrier to a stroller.

It would therefore be desirable to provide a stroller that is capable of receiving a conventional stroller child seat in addition to a car seat.

SUMMARY

In accordance with one aspect of the present invention, a stroller is provided that is configured to transport interchangeable child seats. The stroller includes a stroller frame supported on at least one wheel. The stroller frame is capable of operating in two configurations. In a first configuration, the stroller frame presents first connection locations having a characteristic. In a second configuration, the stroller frame presents second connection locations having a characteristic different from the characteristic of the first connection locations. A first child seat has connectors configured to removably attach to the stroller frame at the first set of connection locations. A second child seat has connectors configured to removably attach to the stroller frame and the second set of connection locations when the first child seat is removed.

It should be appreciated that the foregoing and other aspects of the invention will appear from the following description. In the description, reference is made to the accompanying drawings which form a part thereof, and in which there is shown by way of illustration, and not limitation, preferred embodiments of the invention. Such embodiments do not necessarily represent the full scope of the invention, and reference must therefore be made to the claims herein for interpreting the full scope of the invention.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

The disclosed stroller improves upon one or more of the above-noted problems and/or disadvantages in the prior art. For instance, the stroller includes a frame supported by at least one wheel for movement along a ground surface. The stroller frame supports a child seat that is removably connected to the stroller frame. The stroller frame can be adapted such that when the child seat is removed, the adapted stroller frame is configured to receive a secondary child seat, such as a car seat.

Figure 1:
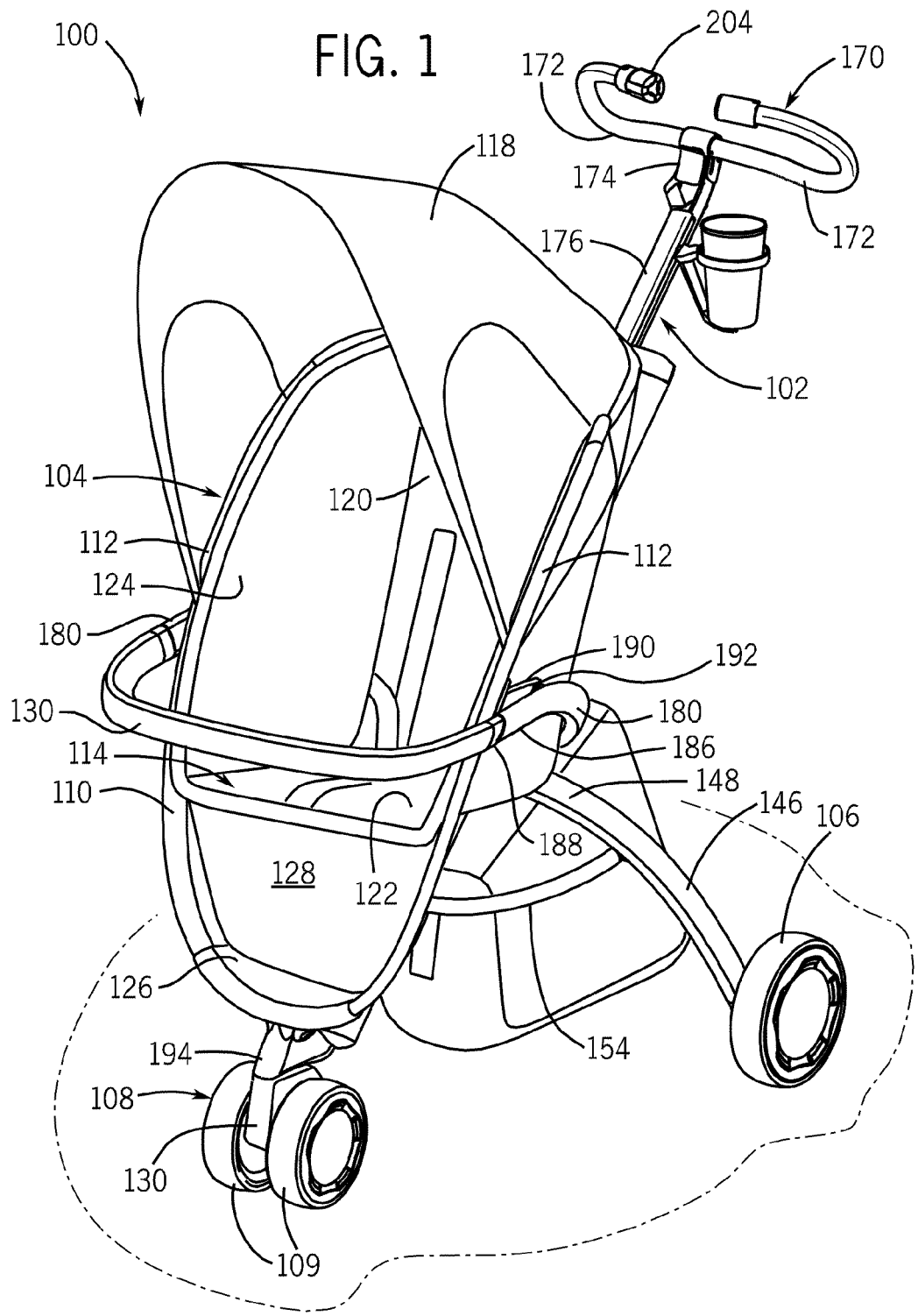
FIG. 1 is a perspective view of an exemplary stroller constructed in accordance with the principles of the present invention.
Figure 2:
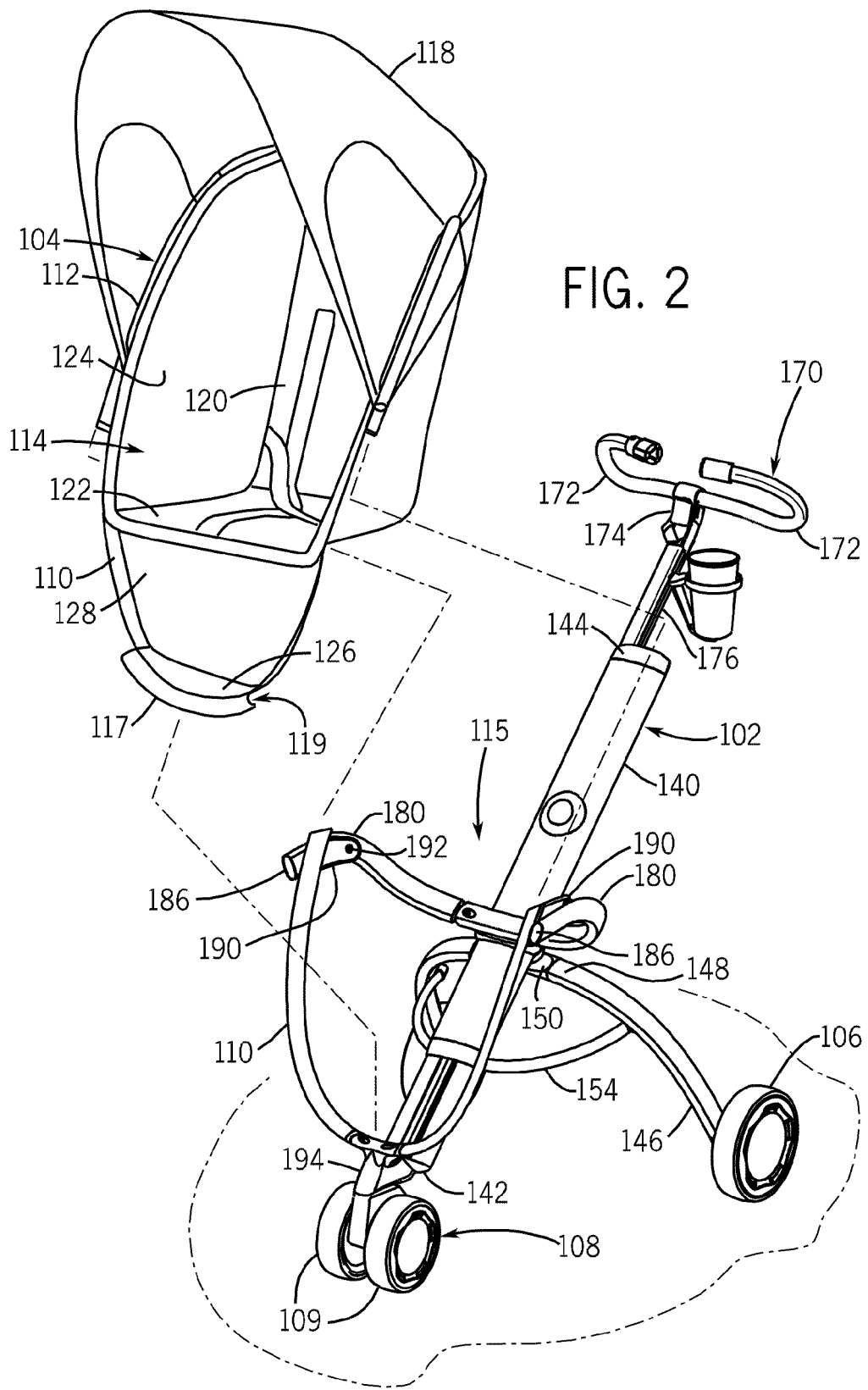
FIG. 2 is an exploded assembly view of the stroller illustrated in FIG. 1 showing the attachment of the child seat onto the stroller frame.

Turning now to the drawings, a stroller 100 is depicted in FIGS. 1-2 and is constructed in accordance with the teachings of the present invention. In the disclosed example, the stroller 100 generally has a frame 102, a seat assembly 104 supported by the frame 102, and one or more wheels supporting the frame 102 on a ground surface. In general, the frame 102 in the disclosed example includes a pair of rear wheels 106 and a single front wheel assembly 108 positioned forward of and at a mid point between the rear wheels. In this example, the front wheel assembly has two wheels 109 spaced apart side by side.

The seat assembly 104 supports a seat 114 having a seat back 120, a seat bottom (or seat surface) 122, and seat side wings 124 positioned on opposite sides of the seat back and the seat bottom.

Figure 3:
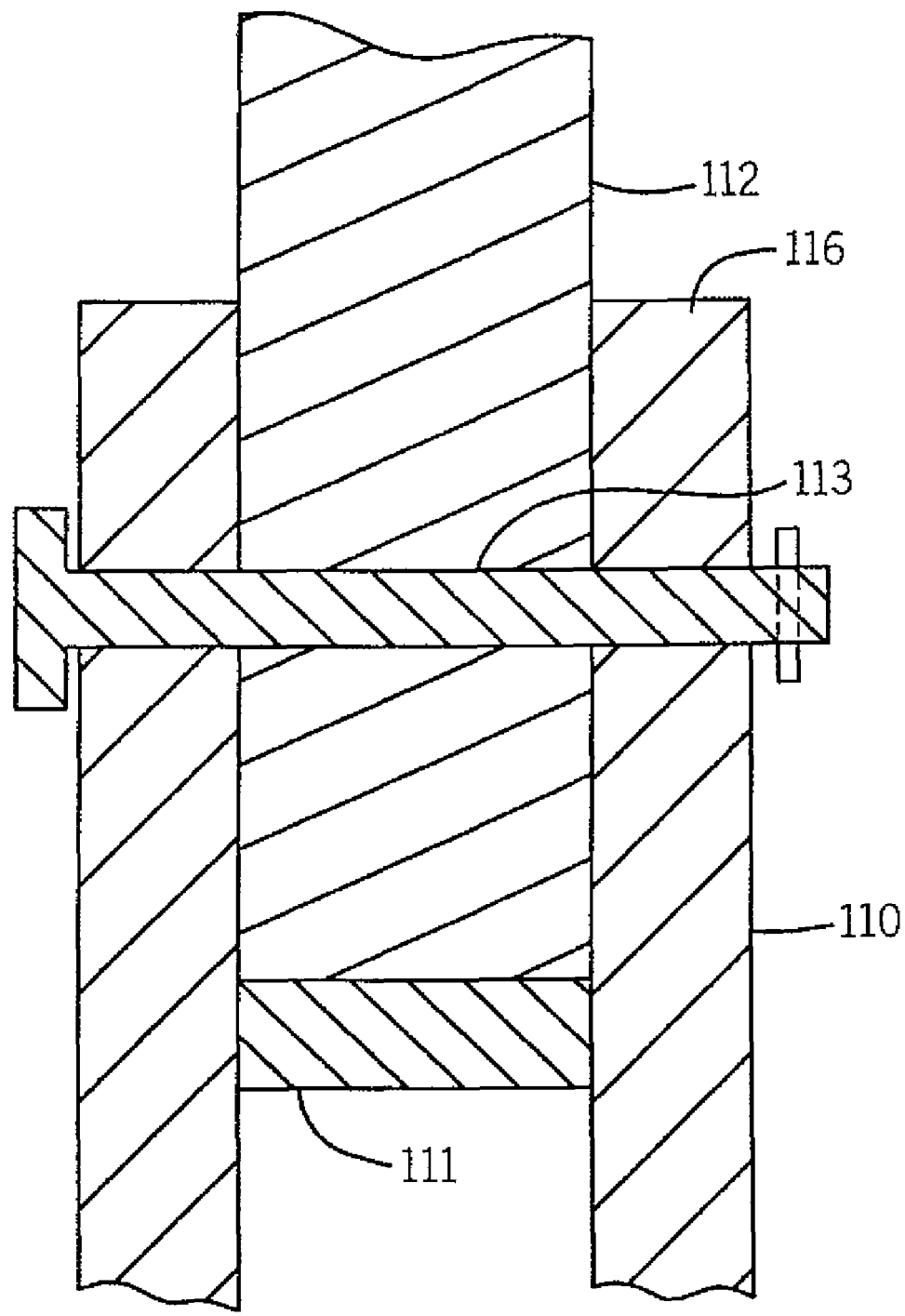
FIG. 3 is a sectional side elevation view of the attachment between the child seat frame and the stroller frame.

Referring also to FIG. 3, the frame 102 in this example generally has a seat mounting frame 110 that is a U-shaped component. In the disclosed example, the seat assembly 104 can be removed from the seat frame 110 and the stroller 100. In general, the removable seat assembly 104 includes a pair of seat attachment tubes 112 positioned on opposite sides of an occupant seat 114. The seat tubes 112 are connected to and can be removed from upper ends 116 of the seat frame 110. Specifically, the seat tubes 112 can be received within the seat frame 110.

In one example, a plate 111 extends horizontally inside the seat frame 110 and provides a seat for the lower ends of the seat tubes 112 (one illustrated in FIG. 3). Additionally, if desired, a pin 113 or alternative locking mechanism can extend through the seat frame 110 and seat tube 112 at a location above the plate to secure the seat tube 112 within the seat frame. Specifically, the pin 111 extends through apertures extending horizontally through the seat frame 110 and the seat tube 112 when the lower end of the seat tube 112 rests on the plate 111. The seat 114 of the seat assembly 104 is thus supported on the stroller at least in part by the seat tubes 112 and has a canopy 118 connected to an upper part of the seat.

Referring to FIGS. 1-3, a footrest 126 is positioned at the bottom of the seat assembly 104 and is suspended from the front edge of the seat bottom 122 by a mesh fabric panel 128 in this example. The footrest 126 is also connected to the lower part of the seat frame 110. Specifically, a flexible clip 117 extends down from the forward end of the footrest 126, and defines a channel 119 extending between the clip 117 and the bottom surface of the footrest 126. The clip defines a curved surface corresponding generally to the contour of the lower part of seat frame 110. The clip 117 snaps over the bottom of the seat frame 110 such that the lower part of the seat frame 110 is disposed within the channel 119, thus securing the seat 114 onto the stroller frame 110.

In the disclosed example, the seat 104 can be made entirely of fabric or like materials and be suspended from the seat tubes 112 and the seat frame 110, when attached. Alternatively, portions of the seat assembly 104 can have a removable cover placed over a generally rigid supporting structure that defines and shapes at least part of the seat, such as the seat bottom 122 and parts of the seat side wings 124. Thus, once attached to the seat frame 110, the seat assembly 104 can be sufficiently supported on the stroller and substantial enough to support the weight of a child occupant.

The seat 114 is thus connected to the seat frame 110 at a first plurality of connection locations 115. The seat 114 is connected such that the seat back 120 extends vertically and the seat bottom 122 extends forwardly towards the front end of the stroller frame 102. The connection locations 115 include the upper ends of the seat frame 110, and the lower end of the seat frame 110. The seat 114 can likewise be removed by first removing the pins 113 (if present) from the seat frame 110 and seat tubes 112. Next, the front end of the seat 114 can be lifted slightly to disengage the clip 117 from the bottom of the seat frame 110. Finally, the seat 114 can be lifted up so that the seat tubes 112 slide out of the seat frame 110.

As will be evident to those having ordinary skill in the art, the configuration and construction of the seat assembly 104 and the seat 114, and the attachment of the seat 114 to the stroller frame 110, can vary considerably and yet fall within the spirit and scope of the present invention. For instance, the locations of the connection locations 115 can be disposed virtually anywhere so long as the child seat 114 is supported on the stroller frame 102, and the configuration of the connection locations could assume essentially any suitable mechanical connection that reliably couples the seat 114 to the stroller frame 102. As will be described in more detail below, the stroller frame 110 can advantageously be configured to provide a second plurality of connection locations that support a second child seat.

The stroller frame 102 in the disclosed example generally has a central spine 140 with a lower end 142 positioned near the front wheel assembly 108. The spine 140 also has an upper end 144 positioned behind the seat back 120 of the seat assembly 114 and between the rear wheels 106. A pair of curved rear legs 146 extends downward in opposite directions from an underside of the spine 140. Each leg 146 is bowed outward and extends in a rearward and downward direction. A proximal or top end 148 of each leg is coupled to a rear leg connector 150 positioned on the underside of the spine 140. The connector 150 is positioned in this example about midpoint between the upper end 144 and the lower end 142 of the spine 140. A distal or lower end 152 of each rear leg 146 in this example carries one of the rear wheels 106.

A rear leg link 154 is positioned on each side of the frame 102 and links each rear leg 146 to the spine 40. Each link 154 has one end 156 coupled to a connector 158 on the underside of the spine 140 positioned below the rear leg connector 150 along the spine. Each link 154 also has another end 160 coupled to a corresponding one of the rear legs 146. The links 154 provide stability for the stroller frame 102, and particularly for the rear legs 146, during use.

The frame 102 in the disclosed example also has a stroller handle 170 for pushing and maneuvering the stroller 100. The disclosed handle 170 generally has an upward facing, open C-shape that forms two handle sections 172. The two sections 172 extend in opposite directions from a handle bracket 174. The handle bracket 174 is coupled to a stanchion 176 that extends from the upper end 144 of the frame spine 140. In the disclosed example, the stanchion 176 is essentially a linear structure and extends parallel to and is aligned with the spine 140, which is also a generally linear structure.

The stroller 100 disclosed herein also has a pair of curved seat frame support arms 180. The support arms 180 extend upward in opposite directions from the top side of the spine 140. Each support arm 180 is bowed outward and extends in a forward and upward direction relative to the spine 140. A proximal or bottom end 182 of each support arm 180 is coupled to a support arm connector 184 positioned on the top side of the spine 140. The support arm connector 184 in this example is positioned at the same location along the spine as the rear leg connector 150, which is on the underside of the spine. A distal end portion 186 of each support arm 180 is bent downward, extends generally horizontally forward, and terminates at an exposed end or face 188.

In this example, a seat frame link 190 is positioned on each side of the seat frame 110 and extends in a rearward direction. Each seat link 190 has a free end 192 that is coupled to one of the support arms 180. The connection point between each seat link 190 and the respective support arm 180 in this example is spaced rearward from the exposed end 188 along the distal end portion 186.

Also in the disclosed example, a frame bracket 194 is located at the lower front portion of the frame 102. The frame bracket 194 is connected to the lower most portion 196 of the seat frame 110 and to the lower end 142 of the spine 140. The front wheel assembly 108 is mounted to and extends downward from the frame bracket 194. The frame bracket 194 links the spine 140 to the seat frame 110 and provides the front wheel connection location in the disclosed example.

The spine 140 is oriented centrally between the rear wheels 106 and defines a central or longitudinal axis of the stroller 100. In the disclosed example as shown in FIG. 2, the spine 140 is oriented at an angle with a low point at its lower end 142 and a high point at its upper end 144. The spine is oriented to position the handle 170 so that a caregiver can stand behind the stroller and push the stroller in a conventional manner by the handle 170. The seat assembly 104 is positioned above and forward of the spine 140 and faces forward relative to the stroller 100 away from the handle 170. However, the arrangement of the seat and frame components disclosed herein can vary and yet fall within the spirit and scope of the present invention. Additionally, the shape, size, configuration, orientation, and location of the various frame and seat assembly components can also vary from the example shown without departing from the spirit and scope of the present invention.

As described above, the seat assembly 104 is removably connected from the stroller frame 102, and the stroller frame 102 can be adapted to a second configuration that supports a second seat assembly connected to the frame 102 at a second plurality of connection locations different than the first plurality of connection locations.

Figure 4:
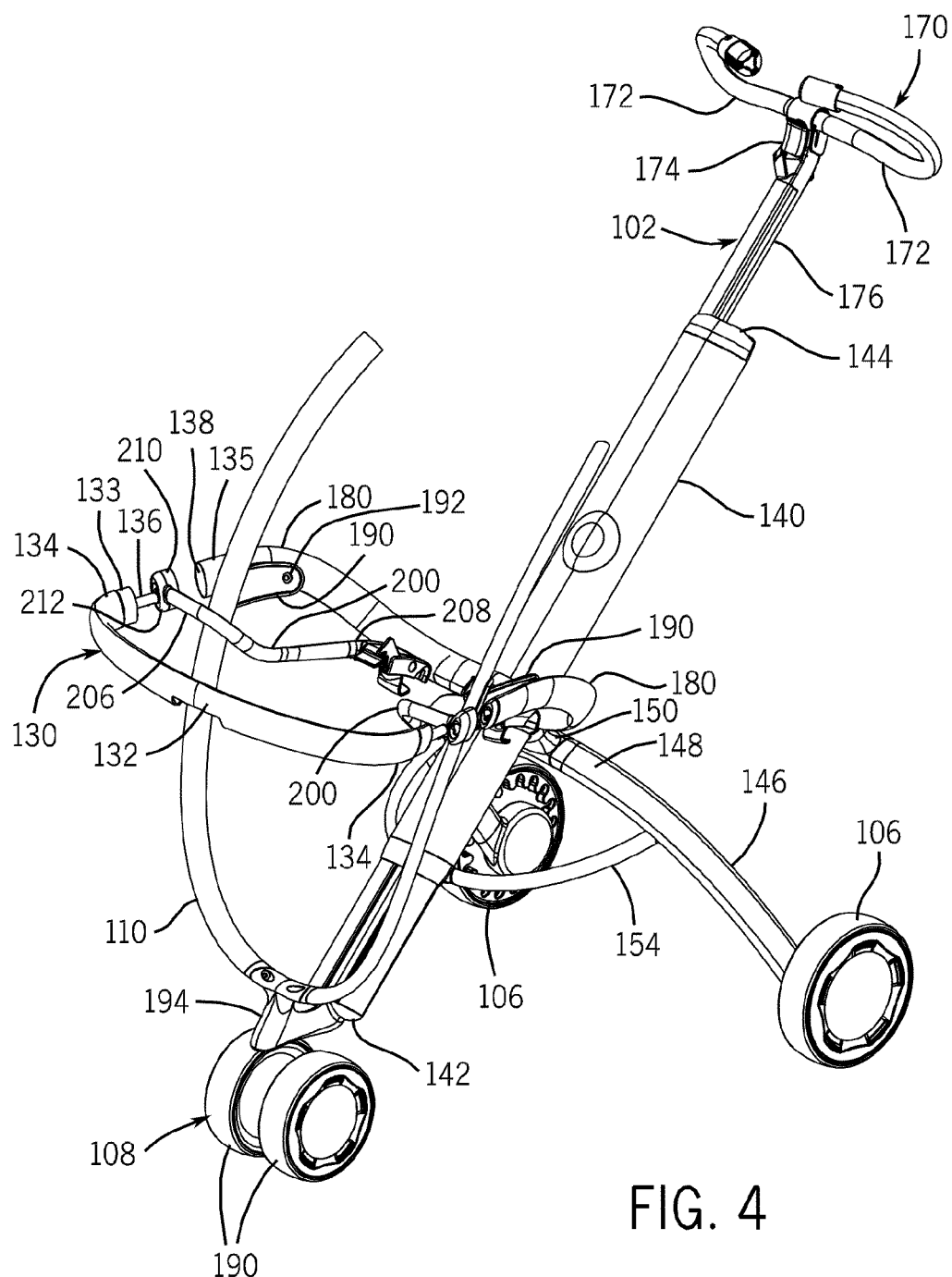
FIG. 4 is a is an assembly view of the stroller frame showing the attachment of one end of a child seat adapter frame to the stroller frame.

Specifically, referring to FIG. 4, an arm bar 130 can connect to the front ends 186 of the curved seat frame support arms 180, which can be fixedly attached to the stroller frame 102. The arm bar 130 is a horizontally oriented U-shaped component having a U-shaped section 132 disposed between a pair of opposing free ends 134. The arm bar 130 is oriented such that the U-shaped section 132 extends generally laterally between the support arms 180, and the free ends 134 extend rearwardly and connect to the frame support arms 180. The connection between the arm bar 130 and the support arms 180 can be effected using any known mechanical connection known to one having ordinary skill in the art. In one aspect of the present invention, the arm bar 130 is removably connected to the frame support arms 180.

In one example, a protrusion 136 extends horizontally rearward from each of the free ends 134 of the arm bar 130. A corresponding recess 138 extends rearwardly into the front end 186 of each support arm 180. The protrusions 136 can be cylindrical and have a diameter less than that of the recesses 138 so that the protrusions 136 are receivable in the recesses 138. While the protrusion 136 can be cylindrical as illustrated, it can alternatively assume any shape in cross section and is sized to be received within the recess 138 to connect the arm bar 130 to the stroller frame 102. An end cap 133 can be disposed at the free ends 134 of the arm bar that abuts a corresponding end cap 135 disposed at the forward end of the support arms 180 when the arm bar 130 is connected to the support arms 180. The end caps 133 and 135 provide a relatively seamless attachment, and enhance the aesthetics of the connection. Furthermore, the end caps 133 and 135 can include any conventional locking mechanism that connects the arm bar 130 to the support arms 180 and prevents the unintentional removal of the arm bar 130 unless a release is actuated by the caregiver.

Advantageously, the stroller frame 102 can be configured to receive a second child seat 234 at a second plurality of connection locations having at least one characteristic that differs from the connection locations of the seat assembly 104. For instance, the characteristic can be the number of connection locations, the location of the at least one of connection locations, the size and/or shape of at least one of the connection locations, the mechanical connection of at least one of the connection locations, or a combination thereof.

Advantageously, the stroller frame 102 can be configured to engage the connectors of the second child seat 234, which can be a car seat, or carrier, whose connectors are suitable for attachment to a conventional base.

Figure 5:
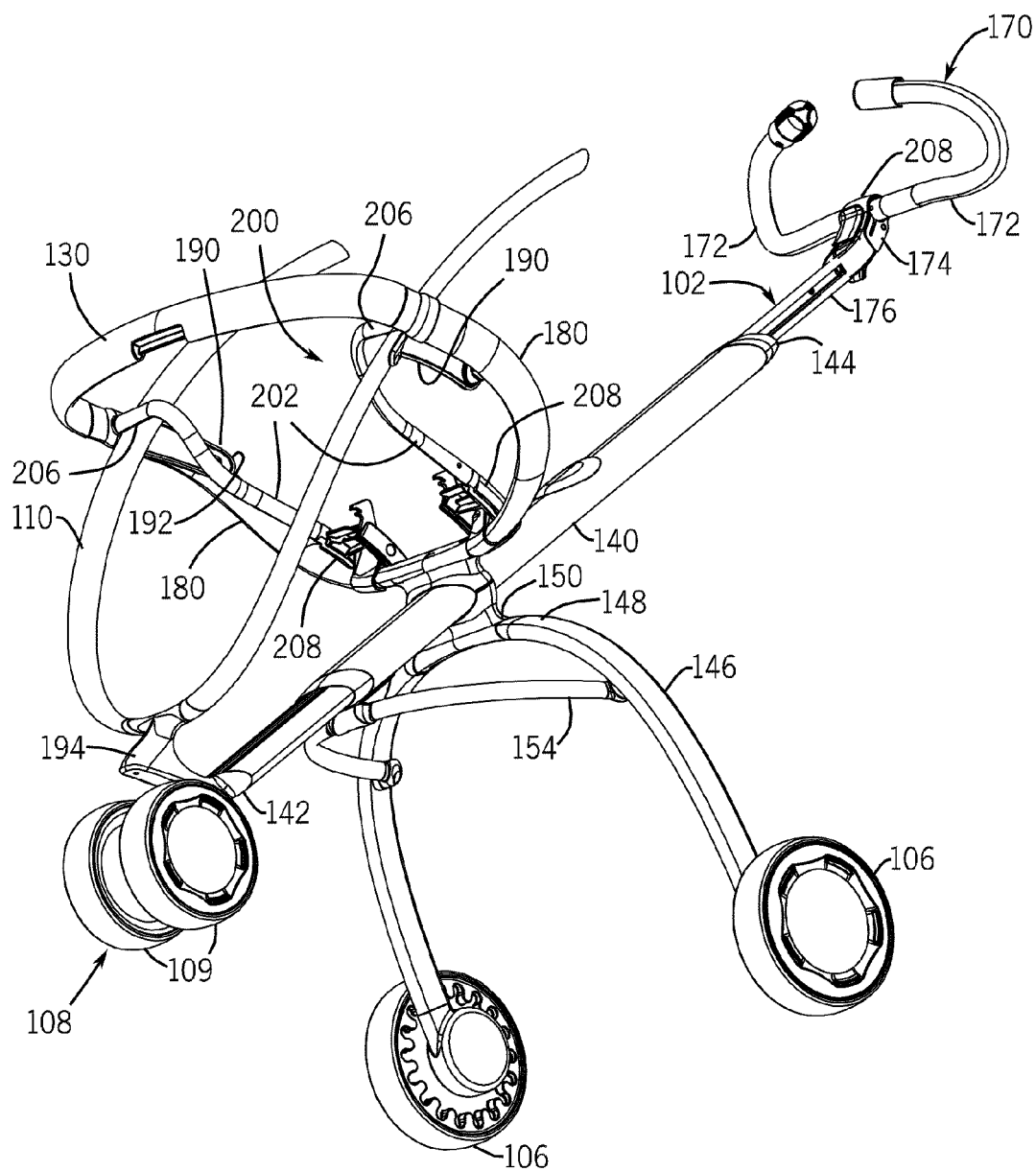
FIG. 5 is a perspective view of the stroller frame with the child seat adapter frame attached.
Figure 6:
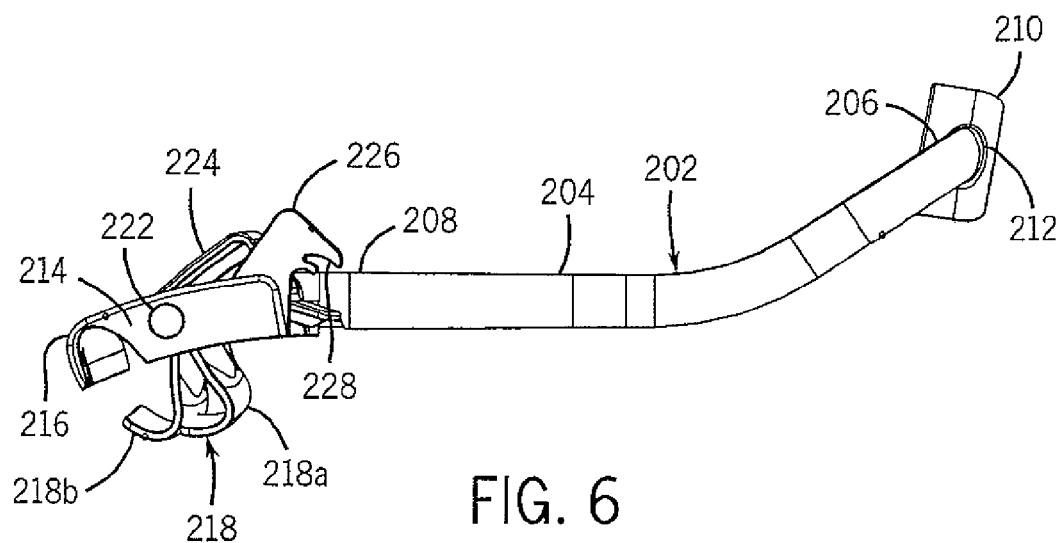
FIG. 6 is a side elevation view of a child seat adapter frame member.
Figure 7:
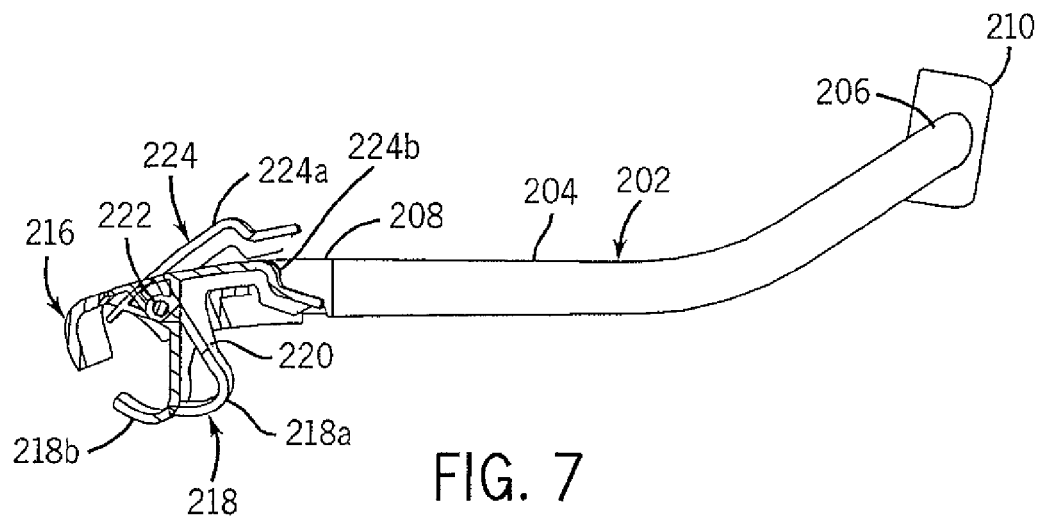
FIG. 7 is a side elevation view of the child seat adapter frame member illustrated in FIG. 6, but with one of the connectors shown in cross section.

Specifically, referring to FIGS. 5-7, an adapter frame 200 can be connected to the stroller frame 102. The adapter frame 200 is illustrated as a pair of adapter frame members 202 connected to the seat frame support arms 180, each including an elongated flexible tubular body 204 formed from either a flexible material capable of supporting a child seat, or a plurality of rigid segments movably connected to each other. The tubular body 204 has a first terminal end 206 that is connected to the stroller frame 102 at the corresponding pair of interfaces between the arm bar 130 and the support arms 180. Each frame member 202 includes a second terminal end 208 disposed opposite the first terminal end 206, and is connected to each corresponding support arms 180 at a location adjacent the spine 140.

The first terminal end 206 of the tubular body 204 is pivotally connected to a collar 210 via a pivot joint 212. Specifically, as best shown in FIG. 4, an aperture 212 extends through the collar 210 and is sized to receive the protrusion 136. The protrusion 136 thus extends through collar 210 and into the recess 210 formed in the support arm 180 to capture the collar between the arm bar 130 and the support arm 180. Once the first terminal end 206 is connected to the stroller frame 102, the adapter body 204 extends inboard from the arm 180/arm bar 130 interface, and then bends rearward and extends toward the support arm at a location adjacent the spine 140. The collar 210 can be rotatable about the protrusion 136, thereby adjusting the vertical position of the second terminal end 208.

Figure 8:
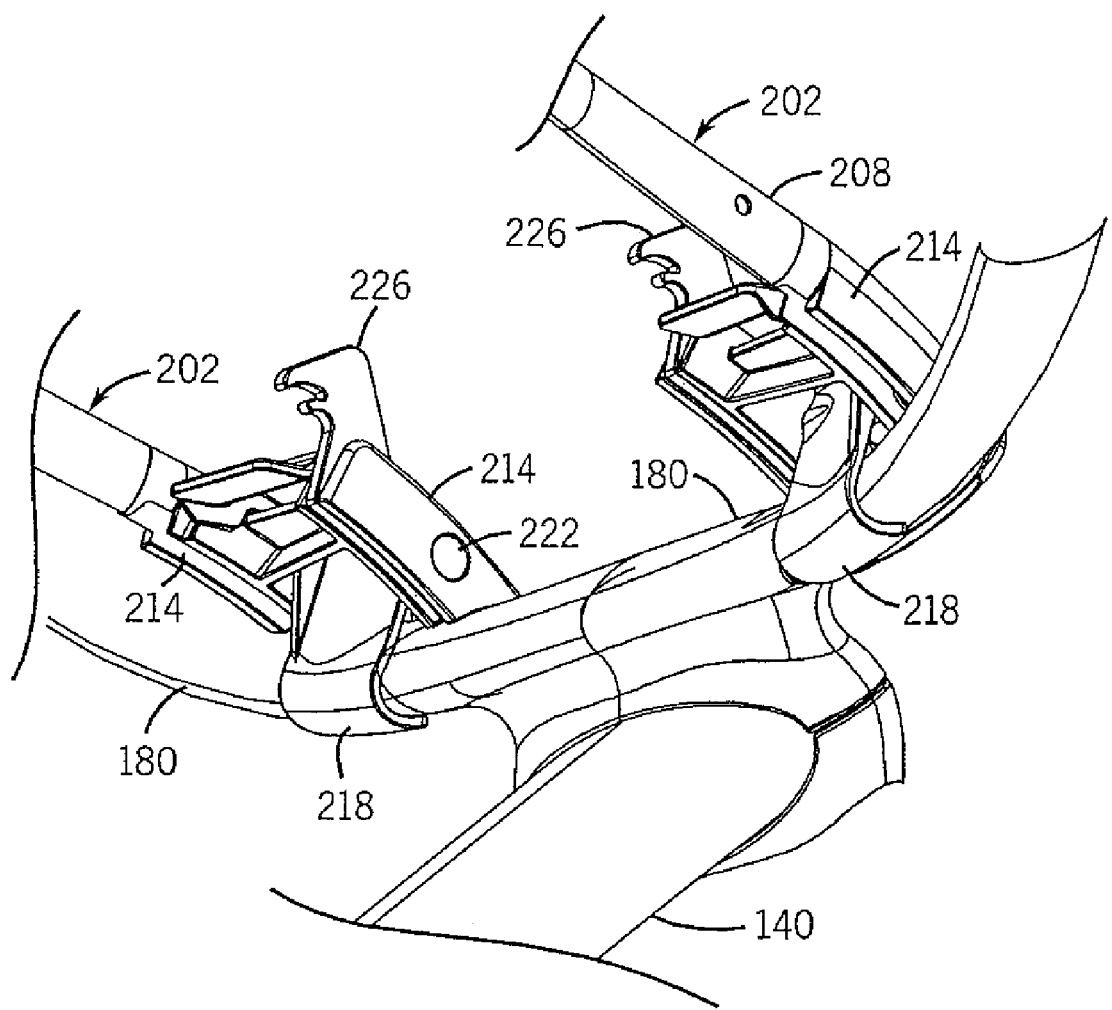
FIG. 8 is an enlarged perspective view showing a second end of the seat adapter frame connected to the stroller frame.

The second terminal end 208 is connected to a bracket 214 extending outward from the adapter body 204. The bracket 214 defines an upper hook 216 at its terminal end. The hook 216 presents a concave lower surface that is sized and shaped to engage the upper surface of the support arm 180. A lower hook 218 is connected to a shaft 220 that is pivotally connected to the bracket 214 via a rivet 222. The lower hook 218 presents a concave upper surface positioned beneath the upper hook 216, and is sized and shaped to engage the lower surface of the support arm 180. The upper end of the shaft 220 is connected to an actuator plate 224. The actuator plate 224 can be depressed from an open angled position 224a to a flat position closed position 224b, thereby causing the shaft 220 to pivot about rivet 222 which, in turn, causes the lower hook 218 to move from an open position 218a to a closed position 218b. When the lower hook 218 is in the open position, a gap separates the hooks 216 and 218 a distance sufficient to allow the support arm to be received therein. When the hook 218 is in the closed position, the upper and lower surfaces of the support arm 180 become captured in the upper and lower hooks 216 and 218, respectively, as illustrated in FIG. 8. Once captured, the actuator plate 224 can be moved to its open position to allow the terminal end 208 to be disengaged from the support arm 180.

Figure 9:
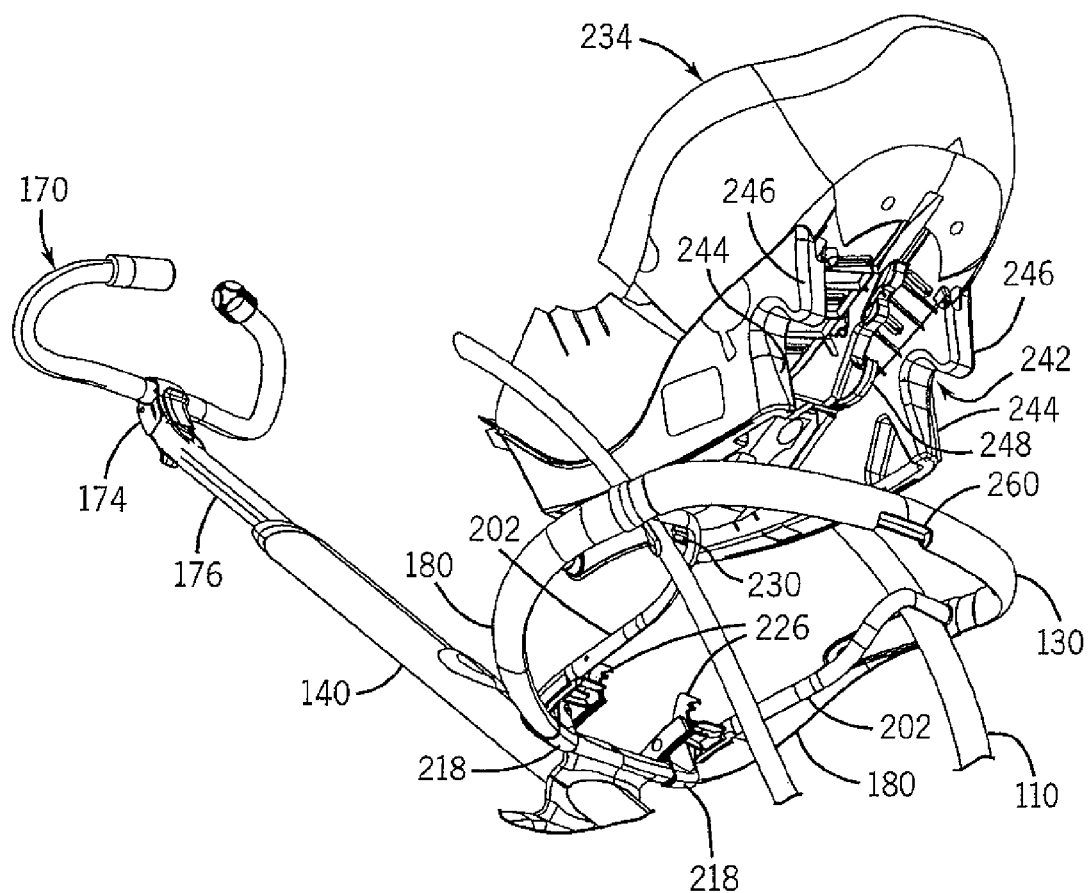
FIG. 9 is an assembly view of a portion of the stroller frame showing the attachment of a second child seat.

The second terminal end 208 is further connected to a latch 226 extending up and slightly rearwardly from the forward end of bracket 214. The latch 226 includes one or more teeth 228 protruding rearwardly and down from the upper end of the latch 226. The teeth 228 of the adapter frame members 202 are shaped to engage corresponding laterally spaced catches 230 extending down from the front end of the bottom surface 232 of a second child seat 234, as shown in FIG. 9. Specifically, each catch 230 includes a U-shaped member extending down from the bottom surface 232. One of the teeth 228 engages the horizontal component of the catch 230 when the seat 234 is connected to the adapter frame 200. Once the latch 226 is engaged with the catch 230, the child seat 234 is pivoted about the latch 226 such that the rear end of the child seat 234 travels vertically down toward the arm bar 130. When connected to the stroller frame 102, the child seat 234 is supported by the arm bar 130, the support arm 180, and the adapter frame 200. Furthermore, the child seat 234 applies a downward force to the actuator plate, thereby maintaining the actuator plate 214 in its closed horizontal position, ensuring that the support arm 180 is securely captured between hooks 216 and 218.

Figure 10:
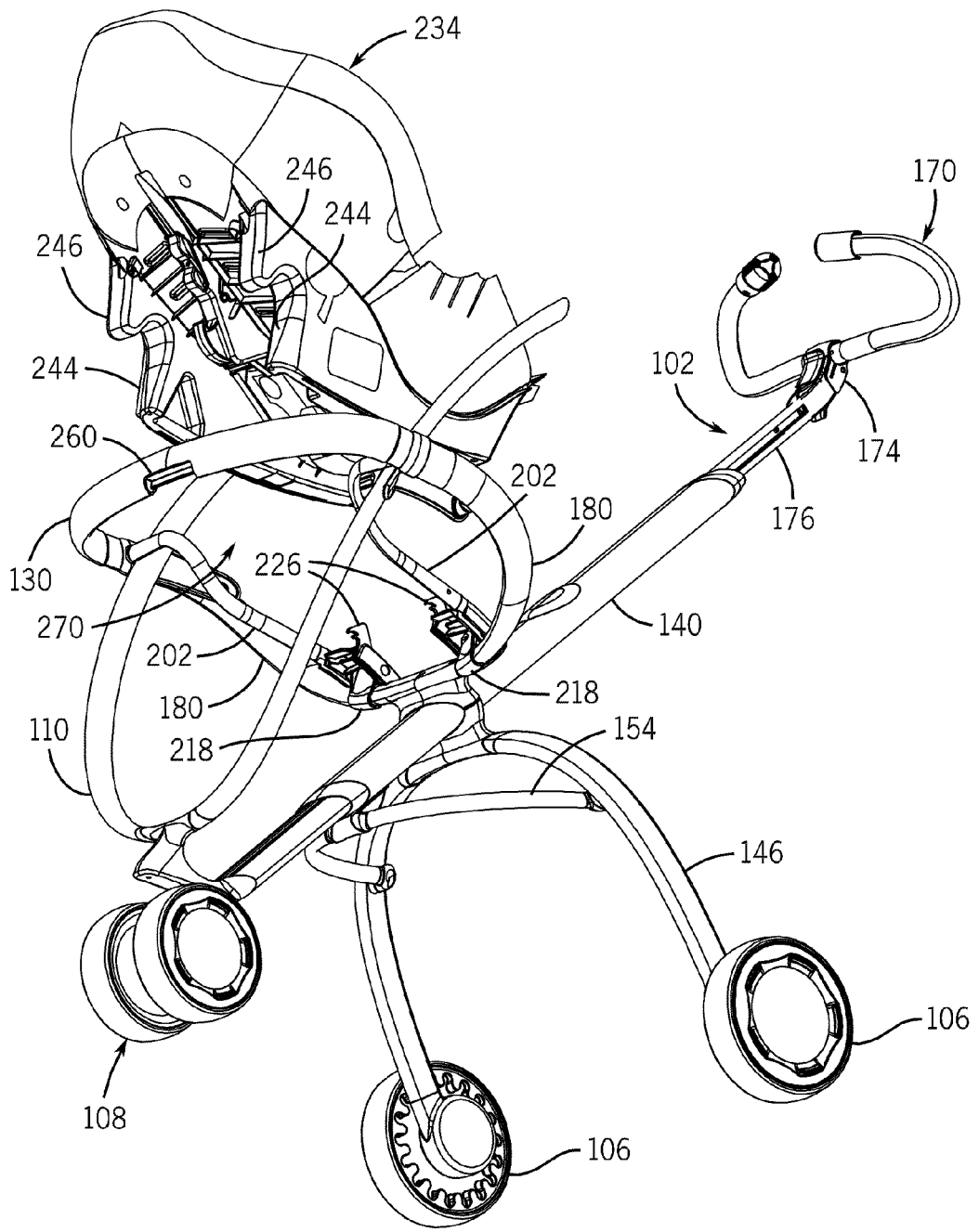
FIG. 10 is an assembly view of the stroller frame showing the attachment of the second child seat illustrated in FIG. 9.
Figure 11:
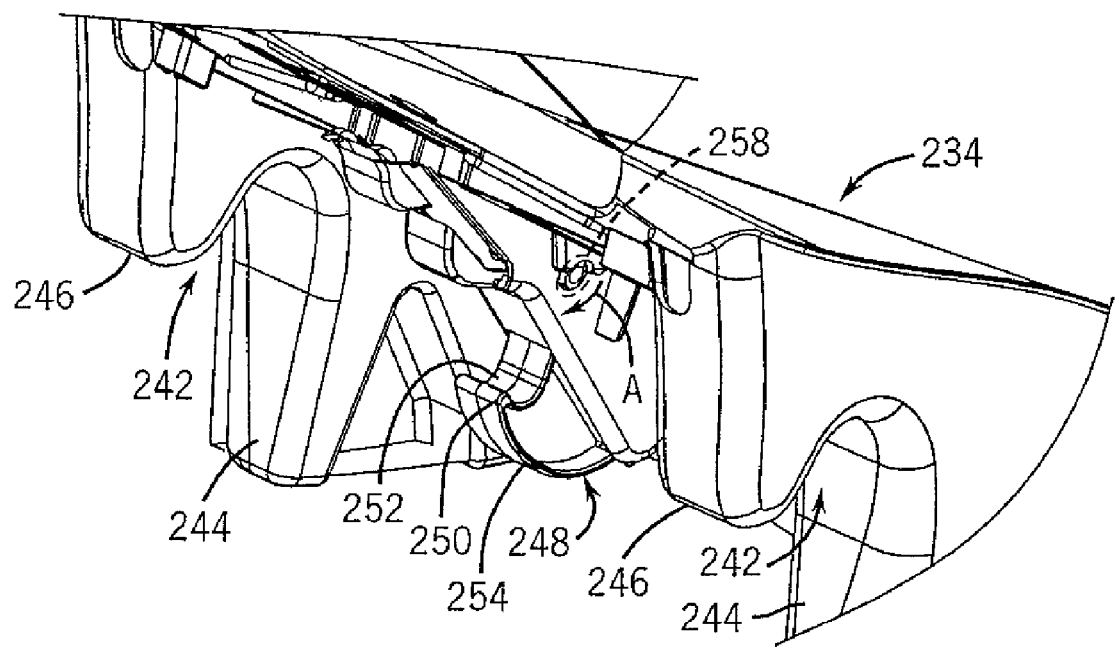
FIG. 11 is an exploded perspective view of the rear attachment structure of the second child seat.
Figure 12:
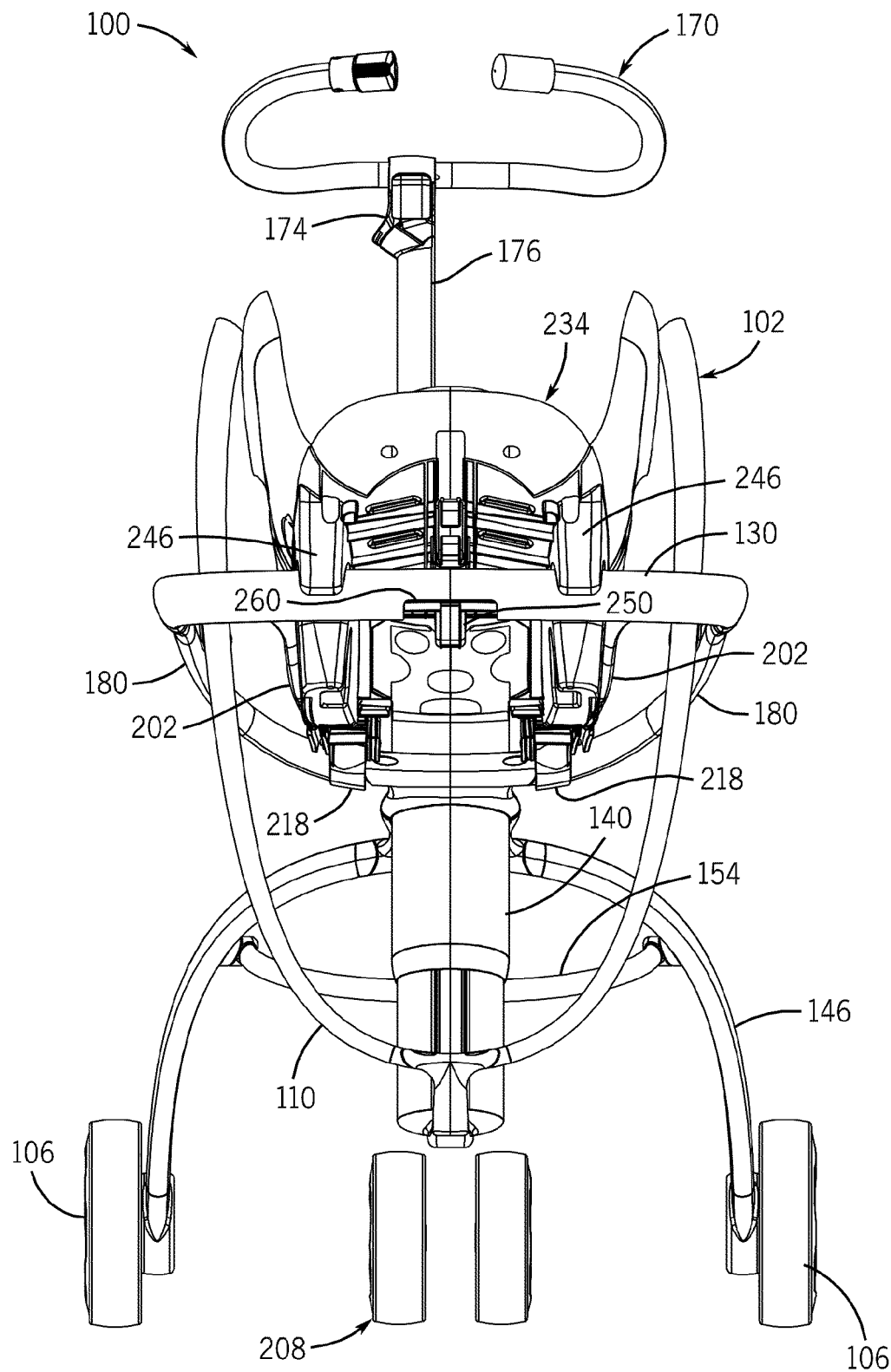
FIG. 12 is a front elevation view of the stroller showing the second child seat attached to the stroller frame.

Referring now to FIGS. 10-12, a pair of laterally spaced concavities 242 is formed in the rear end of the lower surface of the child seat 234. The concavities 242 are defined by spaced front and rear walls 244 and 246, and are sized and shaped to rest on the upper surface of the arm bar 130 such that the arm bar 130 is captured between the front and rear walls 244 and 246, respectively.

The rear end of the lower surface of child seat 234 is further connected to a downwardly depending spring-loaded latch 248. The latch 248 includes a hook portion 250 having a concave surface 252, facing up and toward the forward end of the stroller frame 102 (toward the rear end of the child seat 234). The lower surface 254 of the hook portion 250 is angled with respect to the vertical. The latch 248 is connected to the lower surface of the child seat 234 via a rivet 256 that is coupled to a torsion spring 258 that biases the hook portion 250 towards the forward end of the stroller frame 102 (the rear end of the child seat 234) along the direction of Arrow A. The arm bar 130 has a ribbed seat 260 having a reduced thickness with respect to the rest of the arm bar 130. The seat 260 positioned on the arm bar 130, and sized and shaped, to engage the hook portion 250 of latch 248.

Figure 13:
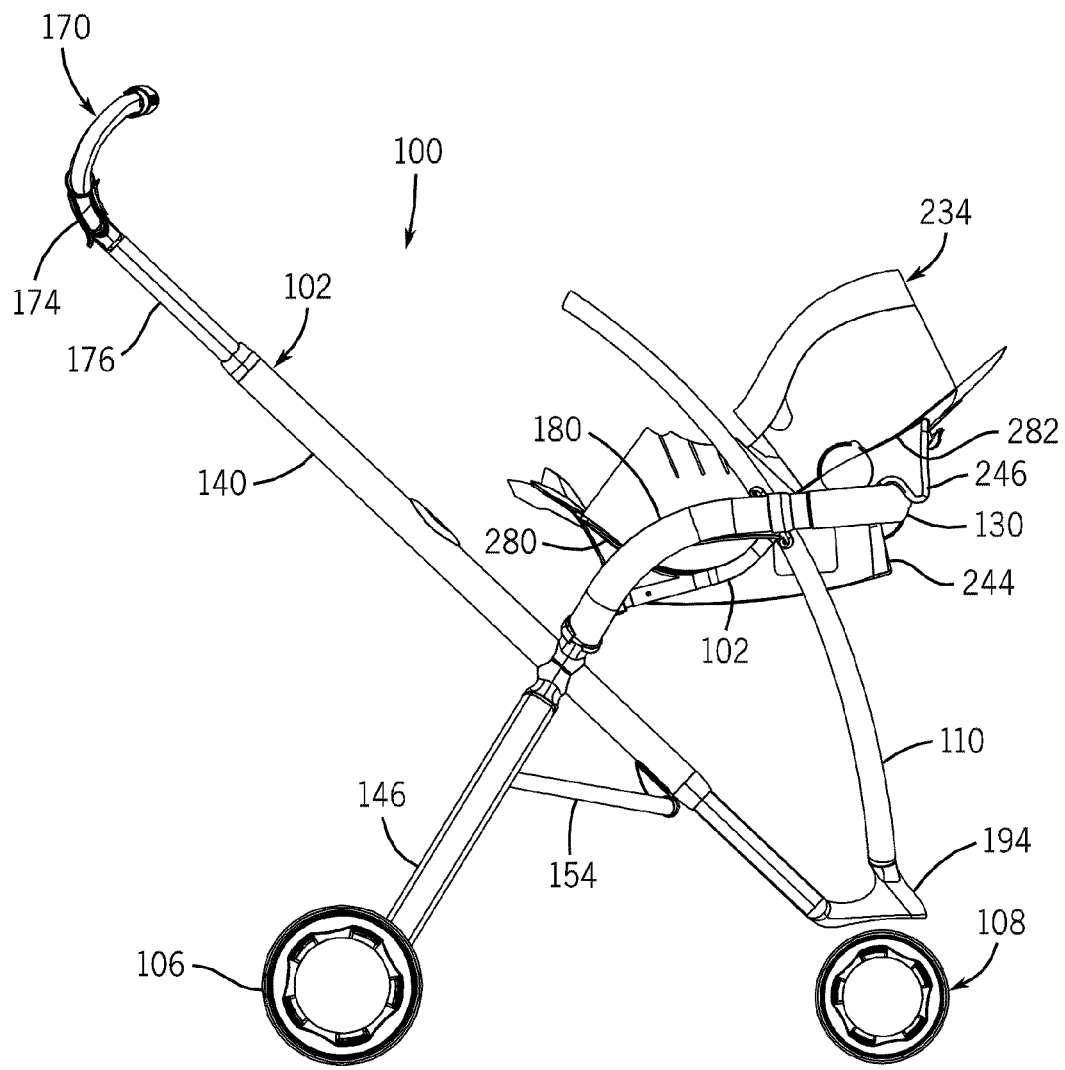
FIG. 13 is a side elevation view of the stroller showing the second child seat attached to the stroller frame.

Accordingly, as the rear end of the seat 234 pivots downwardly about latches 226, the lower surface 254 of the hook portion 250 cams along the upper surface of the ribbed seat 260 as the hook portion 250 rotates against the biasing force of the torsion spring 258. Once the upper lip of the lower surface 254 clears the seat 260, the hook portion 250 snaps up under the biasing force of spring 258 and engages the seat 260, as illustrated in FIG. 12. As illustrated in FIG. 13, the second child seat 234 is oriented such that the seat portion 280 extends from the seat back 282 in a direction forward along the stroller frame 102. Advantageously, the child seat 234 is oriented on the stroller frame 102 as a car seat with respect to forward motion.

When the seat 234 is to be removed, the caregiver manually depresses the hook portion 250 and lifts the rear end of the child seat 234 off of the arm bar 130. As the rear end of the child seat 234 is lifted off the arm bar 130, the catches 230 pivot away from the corresponding latches 226 of the adapter frame 20. Once the latches 226 and catches 230 are clear from engagement, the car seat 234 can be lifted off the stroller frame 102. Once the car seat 234 is clear from the stroller frame 102, the actuator plate 224 is free to be rotated to the unlocked position, and the hook portions 216 and 218 can be removed from engagement with the support arm 180. The arm bar 130 can then be removed from the support arm 180, and the adapter frame 200 can be removed from the stroller frame 102.

It should thus be appreciated that the stroller frame 102 can be configured to provide a second set of connection locations 270 (see FIG. 10) configured to receive the second child seat 234. The connection locations differ from connection locations 115 in terms of at least one characteristic, including the location of the connection locations 115 on the stroller frame 102, the number of connection locations 115, and the mechanical connections at the connection locations 115.

The stroller 100 is therefore advantageously configured to transport one of two different child seats. In one configuration, the stroller frame 102 presents a first set of connection locations that are configured to connect to a conventional stroller child seat. In a second configuration, the stroller frame 102 presents a second set of connection locations that are configured to connect to an auxiliary child seat. In one aspect of the present invention, the auxiliary child seat can be a car seat having connectors that removably attach to a conventional car seat base. A user can therefore remove the car seat base, and subsequently attach the car seat onto the stroller frame 102 to transition the child from the car to a stroller without having to remove the child from one seat and place the child in another seat. The present invention thus allows a child to be transferred from an automobile to a stroller with minimal disturbance to the child, and in a manner that requires minimal effort by the caretaker.

Although certain embodiments have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A stroller configured to transport interchangeably first and second child seats in first and second in-use stroller configurations, respectively, the stroller comprising:
  a frame assembly comprising a seat frame that defines a seat area for the first child seat, a pair of support arms coupled to the seat frame on respective sides of the seat area, and an arm bar removably coupled to the pair of support arms and extending laterally across the seat area in front of the first child seat between the pair of support arms in the first in-use stroller configuration, the seat frame being configured to removably support the first child seat via a first set of connection locations; and
  a removable child seat adapter frame connected to the frame assembly via an interface between the pair of support arms and the arm bar such that the arm bar and the removable child seat adapter frame are configured to support the second child seat via a second set of connection locations in the second in-use stroller configuration.

2. The stroller as recited in claim 1, wherein the removable child seat adapter frame supports a lower surface of the second child seat.

3. The stroller as recited in claim 1, wherein the first child seat has a seating surface extending from a seat back toward a front end of the frame assembly, and wherein the second child seat has a seating surface extending from a seat back toward a rear end of the frame assembly.

4. The stroller as recited in claim 1, wherein the removable child seat adapter frame comprises a tubular body.

5. The stroller as recited in claim 1, wherein the removable child seat adapter frame includes a pair of adapter frame members attached to the frame assembly at the first-named interface and a further interface between the pair of support arms and the arm bar.

6. The stroller as recited in claim 5, wherein an end of the removable child seat adapter frame is attached to the pair of support arms.

7. The stroller as recited in claim 6, wherein the end of the removable child seat adapter frame comprises a hook operably coupled to the pair of support arms, the hook being connected to the pair of support arms by an actuator plate retained in a locked position by the second child seat.

8. The stroller as recited in claim 1, wherein the removable child seat adapter frame comprises a collar through which the arm bar extends at the interface.

9. A stroller as recited in claim 1, wherein the removable child seat adapter frame extends laterally inward and rearward from the interface and between the pair of support arms.

10. A stroller as recited in claim 1, wherein the removable child seat adapter frame includes a pair of frame members, a first frame member of which extends from the interface, and a second frame member of which extends from a further interface between the pair of support arms and the arm bar.

11. A stroller as recited in claim 1, wherein the first set of connection locations are on the seat frame.

12. A stroller as recited in claim 1, wherein the second set of connection locations are on the removable child seat adapter frame and the arm bar.

13. A stroller as recited in claim 1, wherein each support arm extends in a forward direction along a respective side of the seat frame.

14. A stroller as recited in claim 1, wherein the frame assembly further includes a central spine that defines a longitudinal axis oriented at an angle such that the seat area is positioned above and forward of the central spine.

15. A stroller as recited in claim 14, wherein each support arm extends from the central spine.

16. A stroller as recited in claim 1, wherein the arm bar includes a pair of free ends that connect to respective front ends of the pair of support arms such that the interface between the pair of support arms and the arm includes a pair of interfaces at which the arm bar is attached to the pair of support arms.

17. A stroller as recited in claim 1, wherein the arm bar includes a U-shaped component with a pair of free ends that connect to respective ends of the pair of support arms.

18. A stroller to transport interchangeably first and second child seats in first and second in-use stroller configurations, respectively, the stroller comprising:
  a frame assembly comprising a seat frame that defines a seat area for the first child seat, a pair of support arms coupled to the seat frame on respective sides of the seat area, and an arm bar removably coupled to the pair of support arms and extending laterally across the seat area in front of the first child seat between the pair of support arms in the first in-use stroller configuration, the seat frame being configured to removably support the first child seat via a first set of connection locations; and
  a removable child seat adapter connected to the frame assembly via an interface between the pair of support arms and the arm bar such that the arm bar and the removable child seat adapter are configured to support the second child seat via a second set of connection locations in the second in-use stroller configuration;
  wherein the removable child seat adapter comprises a collar through which the arm bar extends at the interface, and
  wherein the removable child seat adapter comprises a tubular body connected to the collar via a pivot joint.

19. The stroller as recited in claim 18, wherein the tubular body is flexible.

* * * * *